United States Patent
Stählin et al.

(10) Patent No.: US 8,401,758 B2
(45) Date of Patent: Mar. 19, 2013

(54) METHOD AND DEVICE FOR ASSISTING A VEHICLE OPERATOR

(75) Inventors: Ulrich Stählin, Eschborn (DE); Adam Swoboda, Groß-Gerau (DE); Thomas Grotendorst, Eschborn (DE)

(73) Assignee: Continental Teves AG & Co. oHG (DE)

( * ) Notice: Subject to any disclaimer, the term of this patent is extended or adjusted under 35 U.S.C. 154(b) by 0 days.

(21) Appl. No.: 12/747,054

(22) PCT Filed: Dec. 9, 2008

(86) PCT No.: PCT/EP2008/067066
§ 371 (c)(1),
(2), (4) Date: Jan. 6, 2011

(87) PCT Pub. No.: WO2009/074547
PCT Pub. Date: Jun. 18, 2009

(65) Prior Publication Data
US 2011/0098898 A1    Apr. 28, 2011

(30) Foreign Application Priority Data

Dec. 13, 2007 (DE) .......................... 10 2007 060 603
Dec. 9, 2008 (DE) .......................... 10 2008 060 869

(51) Int. Cl.
*G06F 7/70* (2006.01)
(52) U.S. Cl. ....................................................... 701/70
(58) Field of Classification Search ...................... 701/70
See application file for complete search history.

(56) References Cited

U.S. PATENT DOCUMENTS

| | | | |
|---|---|---|---|
| 5,940,010 A | 8/1999 | Sasaki et al. | |
| 6,166,658 A * | 12/2000 | Testa | 701/93 |
| 7,466,227 B2 * | 12/2008 | Chen et al. | 340/539.13 |
| 2003/0078718 A1 | 4/2003 | Takenaga et al. | |
| 2005/0128063 A1 | 6/2005 | Isaji et al. | |
| 2005/0140523 A1 * | 6/2005 | Publicover | 340/907 |
| 2006/0095195 A1 * | 5/2006 | Nishimura et al. | 701/96 |
| 2007/0131471 A1 * | 6/2007 | Ehmanns et al. | 180/335 |
| 2007/0222638 A1 * | 9/2007 | Chen et al. | 340/901 |

(Continued)

FOREIGN PATENT DOCUMENTS

| | | |
|---|---|---|
| DE | 100 28 130 C2 | 12/2001 |
| DE | 102 12 674 A1 | 10/2003 |

(Continued)

*Primary Examiner* — James Trammell
*Assistant Examiner* — Michael D Lang
(74) *Attorney, Agent, or Firm* — RatnerPrestia

(57) ABSTRACT

A method for assisting an operator of a vehicle which is approaching a set of traffic lights which permits a stop line to be crossed in at least one first operating state and does not permit the stop line to be crossed in a second operating state. The method provides that (i) a signal which describes the current operating state of traffic lights and the time period until the operating state changes is received in the vehicle, (ii) in the vehicle, verification is carried out on the basis of the received signal as to whether the vehicle can reach the stop line at a speed from a predefined speed range while the set of traffic lights is in the first operating state, and (iii) a speed of the vehicle is influenced and/or a recommendation for influencing the speed is generated as a function of the result of the verification.

14 Claims, 2 Drawing Sheets

U.S. PATENT DOCUMENTS

| | | | |
|---|---|---|---|
| 2008/0012726 A1* | 1/2008 | Publicover | 340/932 |
| 2009/0005948 A1* | 1/2009 | Ibrahim et al. | 701/96 |
| 2009/0063030 A1* | 3/2009 | Howarter et al. | 701/117 |

FOREIGN PATENT DOCUMENTS

| | | |
|---|---|---|
| DE | 10 2004 055 285 A1 | 6/2005 |
| DE | 601 06 794 T2 | 11/2005 |
| DE | 10 2004 033 487 B4 | 3/2006 |
| DE | 10 2006 046 697 A1 | 4/2008 |
| EP | 1 346 892 A2 | 9/2003 |
| EP | 1 628 276 A2 | 2/2006 |
| WO | WO 2008/113836 A1 | 9/2008 |

* cited by examiner

METHOD AND DEVICE FOR ASSISTING A VEHICLE OPERATOR

CROSS REFERENCE TO RELATED APPLICATIONS

This application is the U.S. national phase application of PCT International Application No. PCT/EP2008/067066, filed Dec. 9, 2008, which claims priority to German Patent Application No. 10 2007 060 603.8, filed Dec. 13, 2007, and German Patent Application No. 10 2008 060 869.6, filed Dec. 9, 2008, the contents of such applications being incorporated by reference herein.

FIELD OF THE INVENTION

The invention relates to a method and a device for assisting an operator of a vehicle. In particular, in this context assistance is provided with respect to a set of traffic lights which permits a stop line to be crossed in one operating state and does not permit said stop line to be crossed in a further operating state.

BACKGROUND OF THE INVENTION

In road traffic, sets of traffic lights are frequently used to control the flow of traffic. The sets of traffic lights are usually assigned a stop line which a vehicle can pass in a first operating state of the set of traffic lights, while vehicles are not permitted to cross the stop line in a second operating state of the set of traffic lights. The first operating state of the set of traffic lights is usually indicated by a red light, and the second operating state by a green light.

Serious accidents often occur when a vehicle travels over the stop line assigned to a set of traffic lights when the lights are red. The cause for this may be, for example, that the driver of the vehicle has simply not noticed the set of traffic lights. Furthermore, the vehicle operators generally find it disruptive to have to stop their vehicle at a set of traffic lights. Although this could often be prevented by setting a suitable vehicle speed when approaching the set of traffic lights, it is generally not possible for the driver to determine this.

SUMMARY OF THE INVENTION

An object of the present invention is therefore to assist a vehicle operator when his vehicle is approaching a set of traffic lights.

According to a first aspect of the invention, a method is proposed for assisting an operator of a vehicle which is approaching a set of traffic lights which permits a stop line to be crossed in at least one first operating state and does not permit the stop line to be crossed in a second operating state. In the method, a signal which describes the current operating state of the set of traffic lights and the time period until the operating state changes is received in the vehicle. In the vehicle, verification is carried out on the basis of the received signal as to whether the vehicle can reach the stop line at a speed from a predefined speed range while the set of traffic lights is in the first operating state. A speed of the vehicle is influenced and/or a recommendation for influencing the speed is generated as a function of the result of the verification.

According to a further aspect of the invention, a system is made available for assisting an operator of a vehicle which is approaching a set of traffic lights which permits a stop line to be crossed in at least one first operating state, and does not permit the stop line to be crossed in a second operating state. The system comprises a communication interface which is configured to receive a signal which describes the current operating state of the set of traffic lights and the time period until the operating state changes. In addition, there is an evaluation unit which is configured to verify, on the basis of the received signal, whether the vehicle can reach the stop line at a speed from a predefined speed range while the set of traffic lights is in the first operating state. In addition, the system contains a control unit which is designed to influence a speed of the vehicle and/or to control generation of a recommendation for influencing the speed as a function of the result of the verification.

An advantage of the invention is that it is possible to avoid a vehicle operator unintentionally crossing the stop line while the set of traffic lights is in the second operating state in which it is not permitted to cross the stop line. As a result, road safety at sets of traffic lights is increased. A further advantage of the invention is that the longitudinal speed of the vehicle can be influenced directly or indirectly via a corresponding recommendation in such a way that the vehicle can pass the stop line while the set of traffic lights is in the first operating state without the vehicle having to be previously stopped. As a result, the stopping at the stop line which is perceived as disruptive by the vehicle operator can be avoided, and the driving comfort therefore increased.

In one configuration of the method and of the system there is provision that a setpoint speed at which the vehicle can reach the stop line when the set of traffic lights is in the first operating state is calculated. It is advantageous in this configuration that a setpoint speed is calculated in such a way that the vehicle arrives at the stop line if it is permitted for the vehicle to pass the stop line. This may either take place in a current phase in which the set of traffic lights is in the first operating state or—if the set of traffic lights is currently in the second operating state—in a following phase in which the set of traffic lights has the first operating state.

A further configuration of the method and of the system provides that the setpoint speed which is determined is set by automatic activation of the brakes and/or by automatic adaptation of a drive torque of the vehicle. This is preferably done by means of an adaptive cruise controller which adjusts the vehicle speed to the setpoint speed as long as a distance between the vehicle and an object traveling in front is greater than a threshold value. If the threshold value is undershot, the vehicle speed is set by means of a distance controller in such a way that the distance between the vehicle and an obstacle traveling in front assumes a specific value. This prevents rear end collisions when the vehicle approaches the set of traffic lights.

A further development of the method and of the system is defined by the fact that an operator control device, which can be operated by the vehicle operator and has the purpose of influencing a drive torque of the vehicle, is subjected to a controllable restoring force as a function of the result of the verification. As a result, the vehicle operator can be alerted to the fact that the vehicle is approaching a set of traffic lights. In addition, the vehicle operator can be alerted to the state of the set of traffic lights by means of the restoring force.

The object of a driving recommendation on the basis of a restoring force which is applied to the operator control device is effective in particular if the vehicle operator is just activating the operator control device. In particular, if the vehicle speed which is set by the vehicle operator is too high, the driver can be prompted by the restoring force to reduce the vehicle speed. One embodiment of the method and of the system therefore includes the operator control device being subjected to a controllable restoring force when the vehicle can reach the stop line with a reduced speed when the set of traffic lights is in the first operating state.

An associated configuration of the method and of the system is defined by the fact that the controllable restoring force is determined as a function of a difference between a detected vehicle speed and the setpoint speed. In this context, a speed control operation in which the controllable restoring force is output as a manipulated variable is preferably performed.

In one embodiment of the method and of the system there is also provision that the operator control device is subjected to a controllable restoring force if the vehicle cannot reach the stop line at a speed from the predefined speed range when the set of traffic lights is in the first operating state. In this case, the vehicle must be stopped at the stop line. The restoring force then indicates this to the driver and warns the driver to cross the stop line when the set of traffic lights is in the second operating state. The predefined speed range preferably comprises speeds which are higher than a threshold value.

In the previously mentioned situation, a predefined restoring force is preferably set. This may be, in particular, a restoring force which is the maximum one which can be set in order to impart the indication or the warning as clearly as possible.

In configurations of the method and of the system, the vehicle operator can override the driving recommendation if he wishes to do this or considers it necessary.

In particular, one configuration of the method and of the system provides that a controllable restoring force for acting on the operator control device is reduced if the position of the operator control device has been changed in a direction counter to the restoring force. As a result, the vehicle operator has the possibility of causing the controllable restoring force to be reduced by activating the operator control device with a relatively large force counter to the restoring force.

One configuration of the method and of the system is defined in that the controllable restoring force for acting on the operator control device is reduced if the operator control device is used to request, over a time period which exceeds a predefined period, a larger drive torque than the drive torque before the operator control device was subjected to the controllable restoring force. In this configuration, the restoring force is advantageously reduced only if the vehicle operator has changed the position of the operator control device in a direction counter to the restoring force during a predefined period.

A further configuration of the method and of the system includes the fact that the controllable restoring force for acting on the operator control device is reduced if the position of the operator control device is changed in the direction counter to the restoring force with a rate of change which exceeds a predefined value. In this configuration, the reduction of the controllable restoring force is advantageously made dependent on the speed at which the vehicle operator activates the operator control device in the direction counter to the restoring force.

In addition, one configuration of the method and of the system includes the fact that the operator control device is configured as an accelerator pedal. Such an accelerator pedal is used especially in vehicles with four or more wheels, usually as an operator control device with which the vehicle operator can control a drive engine of the vehicle. However, the operator control device can, for example, equally also be a rotary handle. Such a rotary handle is usually used in two-wheeled vehicles to control the drive engine. A joystick, such as is used, for example, in special vehicles or drive-by-wire vehicles, is also conceivable as an operator control device.

Furthermore, one embodiment of the method and of the system provides that the signal, which describes the current operating state of the set of traffic lights and the time period until the operating state changes, is transmitted by a transmitting device assigned to the set of traffic lights, and is received by means of a radio interface of the motor vehicle. This embodiment has the advantage that the signal can be transmitted to the vehicle via a radio link. The radio link may be configured, for example, as a DSRC (Dedicated Short Range Communication) link which can be used for what is referred to as vehicle-to-X communication. However, the radio link can equally also be based on a different radio technology.

BRIEF DESCRIPTION OF THE FIGURES

The invention is best understood from the following detailed description when read in connection with the accompanying drawings. Included in the drawings is the following figures.

DETAILED DESCRIPTION OF THE PREFERRED EMBODIMENTS

Figure 1:
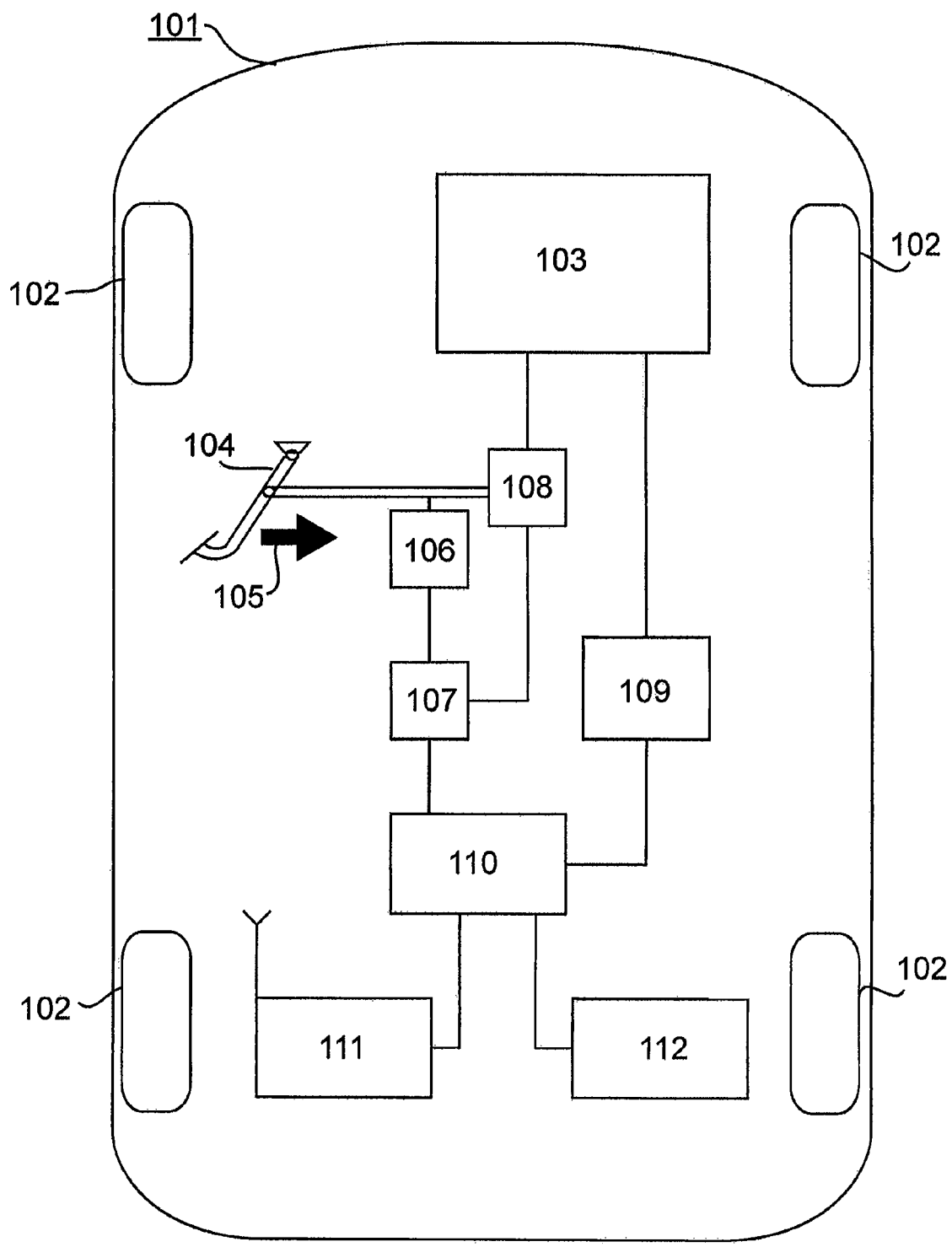
FIG. 1 is a schematic illustration of a vehicle with a system for assisting the vehicle operator when his vehicle approaches a set of traffic lights.

FIG. 1 is a schematic illustration of a motor vehicle 101 with four wheels 102. The motor vehicle 101 is driven by a drive engine 103, which can be, for example, an internal combustion engine, an electric motor or a hybrid motor. The drive engine 103 generates an engine torque which is transmitted to two or four vehicle wheels 102 via a drive train (not illustrated in the figure) in order to drive these wheels 102. The drive engine 103 is controlled by the driver of the vehicle 101 by means of an accelerator pedal 104. As a rule, the position of the accelerator pedal 104 corresponds to an assigned engine speed request and/or drive torque request by the driver. A change in the position of the accelerator pedal in an activation direction which is illustrated in FIG. 1 by means of an arrow 105 leads here to an increase in the engine speed and/or the drive torque which is made available by the drive engine 103.

In one configuration, the accelerator pedal 104 is assigned a force control element 106 which can apply a controllable restoring force to the accelerator pedal 104, which restoring force acts in a direction which is opposed to the activation direction 105. In addition to the force control element 106, a passive spring element (not illustrated in the figure) which supports the accelerator pedal 104 is preferably arranged on the accelerator pedal 104. The restoring force which is generated by the force control element 106 acts here in addition to the restoring force which is applied by the passive spring element. The force control element 106 is controlled by an accelerator pedal control unit 107 which can transmit control instructions to the force control element 106, which instructions bring about the generation of a predefined restoring force. The accelerator pedal control unit 107 is preferably a component of a control unit which comprises a microprocessor for executing programs, the program code of which can be stored in the control unit. The accelerator pedal control unit 107 can be implemented here in the form of one or more program modules.

The position of the accelerator pedal 104 is detected by means of an accelerator pedal sensor 108. The accelerator pedal sensor 108 preferably transmits information about the accelerator pedal position to an engine controller which controls the drive engine 103 as a function of the accelerator pedal position. Furthermore, the measurement signal of the accelerator pedal sensor 108 is preferably also transmitted to the accelerator pedal control unit 107.

Furthermore, the vehicle 101 can have a cruise control system which is known per se. The system comprises a cruise controller 109 which, in one configuration, adjusts the vehicle speed to a predefined setpoint value. In a further configuration, the cruise controller may be an adaptive cruise controller 109 which controls speed and distance. In this context, a predefined setpoint speed is maintained as long as a distance between the vehicle 101 and an object traveling in front does not undershoot a threshold value. However, if this is the case, distance control is carried out in such a way that the distance from the object traveling in front is held at a setpoint value. The threshold value and the setpoint value are generally speed-dependent and may correspond. Obstacles traveling in front are detected with a surroundings sensor system (not illustrated in the figure) of the vehicle 101, which surroundings sensor system comprises, for example, a radar sensor or lidar sensor. In order to influence the vehicle speed, the cruise controller 109 can control the drive engine 103 on the basis of corresponding control instructions. The cruise controller 109 can also preferably activate a brake system (not illustrated in the figure). Said brake system may be embodied, for example, as a hydraulic brake system and may comprise a hydraulic unit which is known per se to a person skilled in the art and which permits automatic build-up in the brake pressure and is actuated by the cruise controller 109.

In order to assist the driver of the vehicle 101 in driving the vehicle while it approaches a set of traffic lights 201, an assistance system is provided which comprises a control device 110. In one configuration, the control device 110 is capable of transmitting control instructions to the accelerator pedal control unit 107 in order to set a restoring force at the accelerator pedal 104. It may equally also be provided that the force control element 106 is controlled directly by the control device 110 and/or the accelerator pedal control unit 107 is integrated into the control device 110. Alternatively or additionally, the control device 110 can transmit setpoint predefined values to the cruise controller 109. The control device 110 is preferably also a program which is executed in a control unit of the vehicle 101. This may be the same control unit which also comprises the accelerator pedal control unit 107 and/or the cruise controller 109. However, the control device 110 can equally also be contained in a further control unit.

In order to carry out the assistance function, the control device 110 uses information about the operating state and the position of a set of traffic lights 201 which the vehicle 101 is approaching, said information being preferably transmitted to the vehicle 101 via a radio link. In the vehicle link are transmitted to the vehicle 101. In the vehicle 101, the information is received by means of a radio interface 111. The radio link may be configured, for example, as a DSRC link, which permits ad hoc communication between vehicles or between a vehicle and a stationary transmitter. In this case, the radio interface 111 is configured in accordance with the DSRC specification. However, it is also equally possible to use a different communication technology such as, for example, WLAN (Wireless Local Area Network), GPRS, UMTS, LTE, WiMax, etc.

Further input signals of the control device 110 are made available by a position-determining device 112 of the vehicle 101 which permits the position of the vehicle 101 and its direction of movement to be detected. Determination of position with accuracy at the level of the lane is preferably made possible here. The position-determining device 112 may be configured, for example, as a satellite-supported locating system which is based, for example, on the GPS (Global Positioning System), the DGPS (Differential Global Positioning System) or some other satellite navigation system. The position-determining device 112 can preferably also access map data which describe the road network of the geographic region in which the vehicle 101 is located. On the basis of the map data, the position-determining device 112 can assign the determined position of the vehicle 101 to a specific route of the road network, and preferably also to a lane of the route. The map data can be stored on a digital data carrier which can be read out with a reading device of the vehicle 101. The position-determining device 112 as well as the map data may be components of a navigation system of the vehicle 101 which can calculate a route to a predefined navigation destination and direct the driver along this route.

Figure 2:
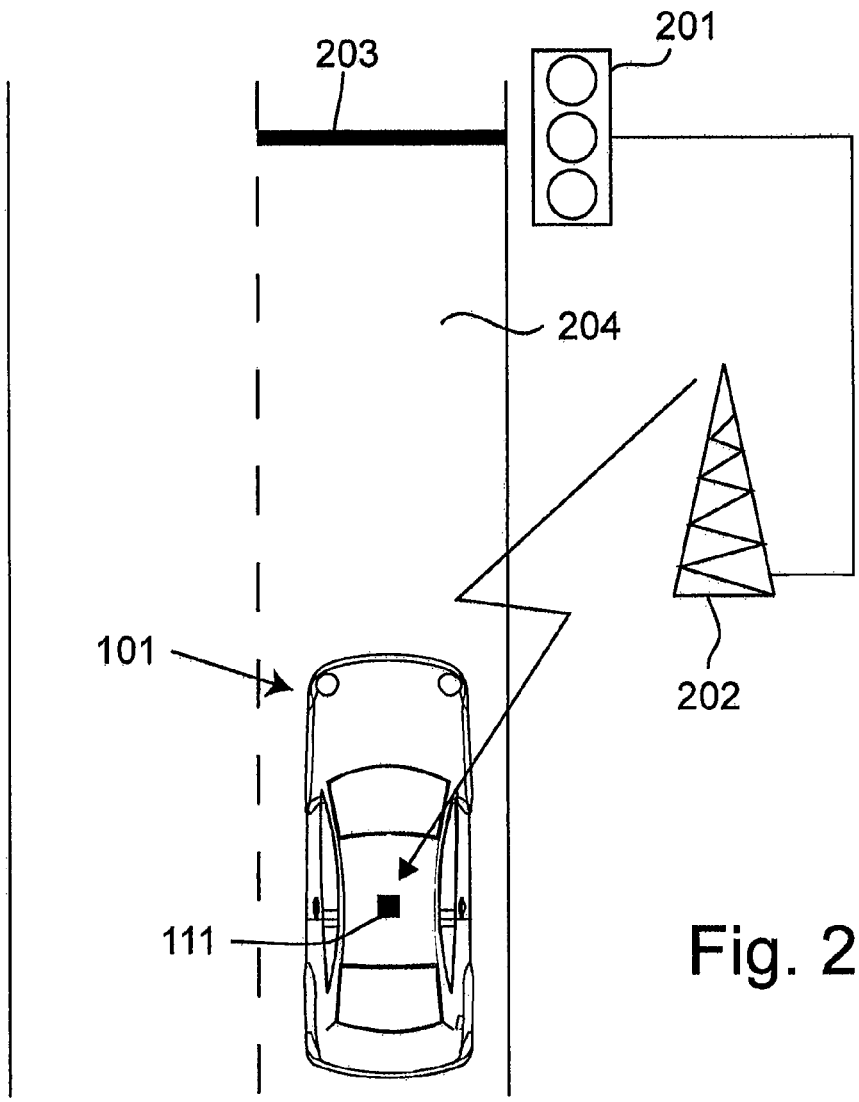
FIG. 2 is a schematic illustration of the vehicle in a situation in which it approaches a set of traffic lights.

FIG. 2 is a schematic illustration of the vehicle 101 in a situation in which said vehicle is approaching a set of traffic lights 201. In the region set of traffic lights 201, a stop line 203, which can be crossed by the vehicle 101 when the set of traffic lights 201 is in a first operating state, referred to below also as green phase, is arranged on a lane 204 of the vehicle 101. In a second operating state of the set of traffic lights 201, also referred to below as red phase, the vehicle 101 is not permitted to cross the stop line 203.

Furthermore, the set of traffic lights 201 can have, in a known fashion, a third operating state in which crossing from the first operating state into the second operating state, or vice versa, is indicated. The stop line 203 is marked on the lane 204, or it may be an imaginary line in the vicinity of the set of traffic lights 201.

The set of traffic lights 201 is assigned a transmitting device 202 which is configured in accordance with the communication technology on which the radio interface 111 of the vehicle 101 is also based. The transmitting device 202 may be contained, for example, in the set of traffic lights 201 or be arranged in the vicinity of the set of traffic lights 201. The transmitting device 202 outputs a radio signal which comprises position information and state information. Said information specifies the position of the stop line 203 by means of position data which is preferably also at least accurate at the level of a lane. In addition, the position information and state information specify the current operating state of the set of traffic lights 201. In addition, the time period until a current green phase ends or a green phase following the current red phase begins is indicated.

The radio signals emitted by the transmitting device 202 can be received by vehicles 101 which are located within the range of the transmitting device 202. The range may be, for example, several hundred meters. Updated position information and state information is preferably transmitted by the transmitting device 202 at regular time intervals so that current position information and state information is always available to the vehicles 101 located within the range of the transmitting device 202.

Figure 3:
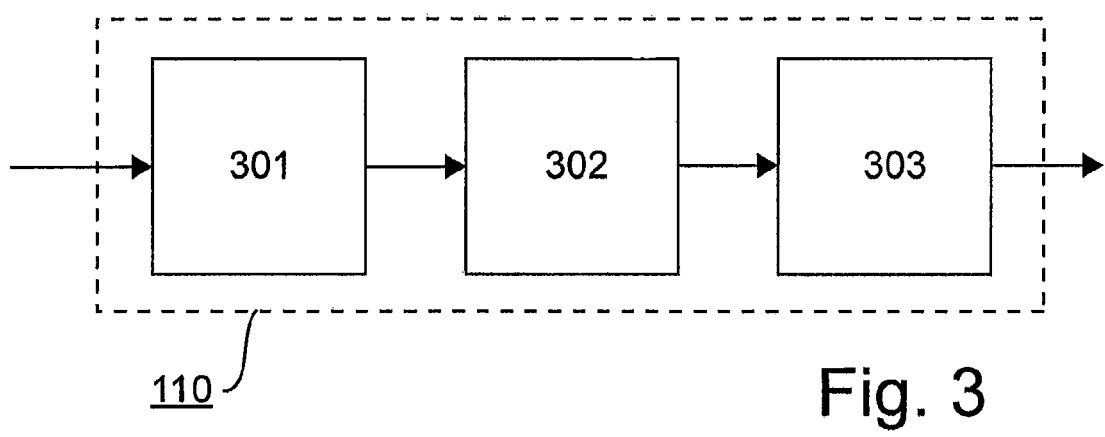
FIG. 3 is a schematic block diagram with components of the assistance system.

When the vehicle 101 is located within the range of the transmitting device 202, it receives the position information and state information by means of the radio interface 111 which passes on the position information and state information to the control device 110 which processes the received position information and state information. A schematic block diagram of the control device 110 is illustrated in FIG. 3. As is shown in the figure, received position information and state information is firstly fed to an evaluation unit 301. The latter verifies whether the vehicle 101 reaches the stop line 203 on its lane so that it is necessary to pay attention to the set of traffic lights 201 on the route of the vehicle 101. For this purpose, the evaluation unit 301 verifies whether the vehicle 101 is located of the same lane 204 as the stop line 203 and whether the vehicle 101 of the stop line 203 is approaching owing to its direction of movement. In this context, the lane of the vehicle 101 and its direction of movement are determined by means of the position-determining device 112 and compared with the position of the stop line 203 which is specified in the position information and state information.

If the evaluation unit 301 detects that the set of traffic lights 201 should be ignored—for example because the vehicle 101 is located on a different lane and/or because it is moving away from the stop line 203—the received position information and state information are rejected. If, on the other hand, it is detected that the vehicle 101 will reach the stop line 203 on its route, further processing of the position information and state information takes place in a calculation unit 302.

The calculation unit 302 verifies whether the vehicle 101 can reach the stop line 203 during a green phase of the set of traffic lights 201 without the vehicle speed leaving a predefined range. The predefined speed range preferably comprises speeds between a predefined minimum speed and a maximum speed. For example, the current speed of the vehicle 101 can be used as the basis for the maximum speed. Said speed can be determined using wheel speed sensors. It is equally possible to provide, for example, that a permitted speed is used as the maximum speed, which speed is transferred, for example, by the transmitting device 202 and can be indicated in the position information and state information. Depending on the result of the verification, a control unit 303 then controls components of the vehicle 101 in order to provide the driver of the vehicle 101 with assistance.

The calculation unit 302 firstly determines, on the basis of the received position information and state information, whether a green phase of the set of traffic lights 201 or a red phase is currently occurring. The verification which is subsequently carried out to determine whether the vehicle 101 can cross the stop line 203 within the predefined speed range, and the measures which are initiated as a function of the result of the verification, differ depending on whether a green phase of the set of traffic lights 201 or a red phase is currently occurring.

Firstly, the case is described in which the calculation unit 302 detects that currently a green phase of the set of traffic lights 201 is occurring. In this case, in one configuration a setpoint speed at which the vehicle 101 can reach the stop line 203 at the end of the green phase is calculated. As a result of the fact that the end of the green phase is taken into consideration, the lowest setpoint speed at which the stop line 203 can still be reached within the green phase is determined. As a result, excessively high speeds are avoided. The time at which the current green phase ends is obtained here from the position information and state information. During the calculation of the setpoint speed, acceleration processes and/or deceleration processes which are necessary to reach the setpoint speed are also taken into account. In this context, the calculation unit 302 can respectively use a predefined value as a basis for the acceleration or deceleration. The determined setpoint speed is then compared with the maximum speed provided. If the setpoint speed is higher than the maximum speed, the calculation unit 302 then detects that the vehicle 101 cannot reach the stop line 203 during the current green phase. If the setpoint speed is not higher than the maximum speed, it is detected that it is possible that the stop line 203 will be passed during the green phase.

If the maximum speed is the current vehicle speed, it can alternatively be provided that the calculation unit 302 verifies whether the vehicle 101 would reach the stop line 203 before the current green phase ends while maintaining the vehicle speed. If this is the case, it is detected that it is possible that the stop line 203 will be passed during the green phase. Otherwise, it is detected that the stop line 203 cannot be crossed during the green phase.

If the calculation unit 302 detects that the vehicle 101 can cross the stop line 203 within the current green phase without the vehicle speed leaving the predefined speed range, and if the setpoint speed which is calculated in the calculation unit 302 is lower than the current vehicle speed, there is no need to change the driving state of the vehicle 101. In this case, in one configuration the control unit 303 does not carry out any further measures. In a further configuration, it can be provided that the driver obtains information, by means of a visual display which is located in his field of vision, about whether the vehicle 101 is approaching the set of traffic lights 201 and can pass through the latter while maintaining the current driving state.

If the predefined maximum speed is higher than the current vehicle speed, it is also possible for the case to occur in which the vehicle 101 can cross the stop line 203 during the current green phase but to do this the vehicle speed has to be increased. If this is the case, it can be provided that the control unit 303 transfers the setpoint speed determined in the calculation unit 302 to the cruise controller 109. The latter adopts the setpoint speed as a setpoint value for the cruise control. If the cruise controller is not already activated, it can be activated by the control unit 303 in one configuration in this context. The cruise controller 109 then adjusts the vehicle speed to the calculated setpoint speed if this does not cause the distance from an obstacle traveling in front to be reduced to below the predefined threshold value. Alternatively or additionally, it is also possible in this case for driver information to be output which informs the driver that he is approaching the set of traffic lights 201 and can cross the stop line 203 at an increased speed during the current green phase.

If the calculation unit 302 detects that the vehicle 101 cannot cross the stop line 203 within the current green phase without leaving the predefined speed range, in one configuration the control unit 303 controls the outputting of a message which informs the driver of the vehicle 101 that he is approaching the set of traffic lights 201 and requests him to stop at the stop line 203. Alternatively or additionally, it can be provided that when the vehicle is approaching the stop line 203 a deceleration, which is necessary to bring the vehicle 101 to a standstill at the stop line 203 starting from the current position of said vehicle 101 and the current speed thereof, is calculated at regular time intervals. The deceleration can either be calculated in the calculation unit 302 or in the control unit 303. If a value of the calculated deceleration is higher than a predefined threshold value, a further measure is carried out by the control unit 303 with the objective of preventing the crossing of the stop line 203 during the red phase which follows the current green phase. In one configuration, the control unit 303 controls in this context the application of a predefined restoring force to the accelerator pedal 104. This is preferably the maximum restoring force which can be applied to the accelerator pedal 104 by means of the force control element 106. For this purpose, the control unit 303 can transfer a corresponding restoring force request to the accelerator pedal control unit 107 which actuates the force control element 106 in accordance with the request.

If a restoring force is applied to the accelerator pedal 104 in the previously described way, it is preferably possible for the driver of the vehicle 101 to override the assistance system, that is to say to cause the restoring force to be reduced. This is preferably done by suitable activation of the accelerator pedal 104. In order to detect such activation of the accelerator pedal 104, the accelerator pedal position is monitored by the accelerator pedal control unit 107. This is done by means of the signals of the accelerator pedal sensor 108. In one configuration, the accelerator pedal control unit 107 reduces the restoring force if the accelerator pedal 104 has been depressed further in the activation direction 105, over a time period which exceeds a predefined duration, than at the time at which the application of the restoring force to the accelerator pedal 104 started. The accelerator pedal position at this time is detected for this purpose and stored in the accelerator pedal control unit 107. Furthermore, it can be provided that the restoring force is reduced when the accelerator pedal 104 is changed into the activation direction 105 with an accelerator pedal gradient which exceeds a predefined threshold value, that is to say when the driver depresses the accelerator pedal 104 at a high speed. One of the abovementioned criteria, or both criteria, can be used by the accelerator pedal control unit 107.

The case will now be described below in which the calculation unit 302 determines, on the basis of the position and state information, that the set of traffic lights 201 is currently in a red phase. In this case, the calculation unit 302 verifies whether the vehicle 101 can cross the stop line 203 during the green phase following the red phase without the predefined speed range being left. For this purpose, a setpoint speed at which the vehicle 101 can cross the stop line 203 at the start of this green phase is preferably calculated. As a result of the fact that the start of the green phase is taken into consideration, the highest setpoint speed at which the stop line 203 can be reached within the green phase is determined. As a result, excessively low speeds are avoided and there is a high probability of the vehicle 203 being able to reach the stop line within the green phase. During the calculation of the setpoint speed, acceleration and deceleration processes, which are necessary to set the setpoint speed, are again taken into account. If the calculated setpoint speed is lower than the minimum speed, the calculation unit 302 detects that the vehicle 101 cannot pass the stop line 203 during the green phase following the current red phase without the predefined speed range being left. Otherwise, it is detected that it is possible to pass the stop line 203 during this green phase.

If it is detected in the calculation unit 302 that the vehicle 101 can pass the stop line 203 in the green phase following the current red phase without the predefined speed range being left, measures to ensure this are preferably taken by the control unit 303.

Such a measure is the transfer of the setpoint speed calculated in the calculation unit 302 to the cruise controller 109. In the cruise controller 109, this speed is adopted as the setpoint value for the cruise control. The cruise controller 109 therefore adjusts the speed of the vehicle 101 to the calculated setpoint speed if the distance between the vehicle 101 and an obstacle traveling in front does not undershoot the predefined threshold value as a result. If the cruise controller 109 is not already activated, in this case it can be activated by the control unit 303 in one configuration.

A further measure is to apply a restoring force to the accelerator pedal 104 which is determined in accordance with the deviation of the current vehicle speed from the calculated setpoint speed. The restoring force is increased here with a deviation which increases in absolute value. If the vehicle speed corresponds to the calculated setpoint speed, no restoring force is preferably applied to the accelerator pedal 104. The restoring force can be set in such a way by means of a controller which is contained, for example, in the accelerator pedal control unit 107 and which controls the force control element 106. The control error which is fed to the controller corresponds here to the difference between the current vehicle speed and the calculated setpoint speed. The manipulated variable which is determined as a function of the control error is the restoring force which is applied to the accelerator pedal 104 by means of the force control element 106.

The two measures described above, that is to say the adjustment of the vehicle speed to the calculated setpoint speed by means of the cruise controller 109 and the application of a restoring force, which is determined as a function of the difference between the vehicle speed and the calculated setpoint speed, to the accelerator pedal 104, can be carried out either alternatively or cumulatively. On the basis of the measures it is possible to ensure that the vehicle 101 approaches the stop line 203 at a speed which is sufficiently low to just reach the stop line 203 when the green phase following the current red phase begins.

If the calculation unit 302 detects that the vehicle 101 cannot pass the stop line 203 in the green phase following the current red phase without leaving the predefined speed range, the measures which have previously been described for the case in which this is detected in a current green phase are preferably carried out. This means that, in the way described above, driver information is output and/or a predefined restoring force is applied to the accelerator pedal 104. The restoring force is reduced if at least one of the conditions already described above is met.

Although the invention has been described in detail in the drawings and the preceding presentation, the presentations are illustrative and exemplary and should not be understood as being restrictive; in particular, the invention is not restricted to the exemplary embodiments which are explained. Further variants of the invention and the implementation thereof emerge for a person skilled in the art from the preceding disclosure, the figures and the patent claims.

In the patent claims, terms such as "comprise", "have", "include", "contain" and the like which are used do not preclude further elements or steps. The use of the indefinite article does not preclude a plurality. An individual device can carry out the functions of multiple units or devices which are specified in the patent claims.

The invention claimed is:

1. A method for assisting an operator of a vehicle which is approaching a set of traffic lights which permits a stop line to be crossed in at least one first operating state and does not permit the stop line to be crossed in a second operating state, the method comprising:

receiving, by a processor in the vehicle, a signal which describes a current operating state of the set of traffic lights and a time period until the operating state changes, verifying, by the processor, whether the vehicle can reach the stop line at a speed from a predefined speed range while the set of traffic lights is in the first operating state based on the received signal, and controlling, by the processor, a speed of the vehicle based on a result of the verification as long as a measured distance between the vehicle and an object located in front of the vehicle is greater than or equal to a threshold value, wherein the speed of the vehicle is controlled to maintain a predefined distance between the vehicle and the object located in front of the vehicle when the measured distance is less than the threshold value.

2. The method as claimed in claim 1, in which a setpoint speed at which the vehicle can reach the stop line when the set of traffic lights is in the first operating state is calculated.

3. The method as claimed in claim 2, in which the setpoint speed which is determined is set by automatic activation of the brakes and/or by automatic adaptation of a drive torque of the vehicle.

4. The method as claimed in claim 2, in which an operator control device, which can be operated by an operator of the vehicle and has a purpose of influencing a drive torque of the vehicle, is subjected to a controllable restoring force as a function of the result of the verification.

5. The method as claimed in claim 4, in which the operator control device is subjected to a controllable restoring force when the vehicle can reach the stop line with a reduced speed when the set of traffic lights is in the first operating state.

6. The method as claimed in claim 4, in which the controllable restoring force is determined as a function of a difference between a detected vehicle speed and the setpoint speed.

7. The method as claimed in claim 4, in which the operator control device is subjected to a controllable restoring force if the vehicle cannot reach the stop line on the basis of a current vehicle speed or a reduced vehicle speed when the set of traffic lights is in the first operating state.

8. The method as claimed in claim 7, in which a predefined restoring force is set if the vehicle cannot reach the stop line at a speed from the predefined speed range when the set of traffic lights is in the first operating state.

9. The method as claimed in claim 4, in which the controllable restoring force for acting on the operator control device is reduced if a position of the operator control device has been changed in a direction counter to the restoring force.

10. The method as claimed in claim 4, in which the controllable restoring force for acting on the operator control device is reduced if the operator control device is used to request, over a time period which exceeds a predefined period, a larger drive torque than the drive torque before the operator control device was subjected to the controllable restoring force.

11. The method as claimed in claim 4, in which the controllable restoring force for acting on the operator control device is reduced if a position of the operator control device is changed in a direction counter to the restoring force with a rate of change which exceeds a predefined value.

12. The method as claimed in claim 4, in which the operator control device is configured as an accelerator pedal.

13. The method as claimed in claim 1, in which the signal is transmitted by a transmitting device assigned to the set of traffic lights, and is received within the vehicle by a radio interface of the vehicle.

14. A system for assisting an operator of a vehicle which is approaching a set of traffic lights which permits a stop line to be crossed in at least one first operating state, and does not permit the stop line to be crossed in a second operating state, said system comprising:
   a communication interface which is configured to receive a signal which describes a current operating state of the set of traffic lights and a time period until the operating state changes,
   an evaluation unit which is configured to verify, on a basis of the received signal, whether the vehicle can reach the stop line at a speed from a predefined speed range while the set of traffic lights is in the first operating state, and
   a control unit which is configured to influence a speed of the vehicle and/or to control generation of a recommendation for influencing the speed as a function of a result of the verification as long as a measured distance between the vehicle and an object located in front of the vehicle is greater than or equal to a threshold value,
   wherein the speed of the vehicle is controlled to maintain a predefined distance between the vehicle and the object located in front of the vehicle when the measured distance is less than the threshold value.

* * * * *

UNITED STATES PATENT AND TRADEMARK OFFICE
CERTIFICATE OF CORRECTION

PATENT NO. : 8,401,758 B2 Page 1 of 1
APPLICATION NO. : 12/747054
DATED : March 19, 2013
INVENTOR(S) : Stählin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 124 days.

Signed and Sealed this
First Day of September, 2015

Michelle K. Lee
*Director of the United States Patent and Trademark Office*